United States Patent [19]  
Lawson et al.

[11] 3,867,327  
[45] Feb. 18, 1975

[54] FLAME-RESISTANT POLYBUTADIENE RESIN

[75] Inventors: David F. Lawson; Delmar F. Lohr, Jr., both of Akron, Ohio

[73] Assignee: The Firestone Tire & Rubber Company, Akron, Ohio

[22] Filed: July 9, 1974

[21] Appl. No.: 486,784

[52] U.S. Cl.... 260/27 BB, 260/42.44, 260/45.75 R, 260/45.7 R, 260/45.95 G
[51] Int. Cl. ............................................. C08f 45/62
[58] Field of Search . 260/45.75 R, 45.95 G, 45.7 R, 260/27 BB, 42.44

[56] References Cited
UNITED STATES PATENTS 3,686,362   8/1972   Hinckley et al..................... 260/887
3,729,436   4/1973   Phillips........................... 260/45.75
3,786,087   1/1974   Conard et al...................... 260/45.75

FOREIGN PATENTS OR APPLICATIONS 1,487,011   6/1967   France

OTHER PUBLICATIONS

Chemical Abstracts – Vol. 68, citation no. 50811g, 1968.

*Primary Examiner*—V. P. Hoke

[57] ABSTRACT

The incorporation of a combination of [1] a bromine-releasing flame-retarding compound (e.g., tetrabromobenzene, hexabromobenzene, decabromobiphenyl, decabromodiphenyl oxide, etc.) and [2] chromium naphthenate in a polybutadiene resin, renders the resin flame resistant.

9 Claims, No Drawings

FLAME-RESISTANT POLYBUTADIENE RESIN

FIELD OF THE INVENTION

This invention relates to butadiene polymer and copolymer resins, and more particularly to increasing the flame resistance of such resins.

BACKGROUND OF THE INVENTION

Butadiene polymer and copolymer resins, particularly those having, in the uncured state, a high proportion of butadiene units incorporated in 1,2-configuration, have come into considerable use, particularly as electrically insulating structural components, friction elements and the like.

It is an object of this invention to increase the flame resistance of butadiene polymer and copolymer resins.

SUMMARY OF THE INVENTION

The above and other objects are secured, in accordance with this invention in compositions comprising:

|  | Parts by Weight |
| --- | --- |
| Polybutadiene resin | 100 |
| A bromine-releasing flame-retarding compound | 2–20 |
| Chromium naphthenate | 0.25–10.0 |
| A metal soap | 0.5 – 5.0 |
| The composition being cured by heating with presence of: | |
| A peroxide curing agent | 0.5 – 6.0 |

The above ingredients are, of course, exclusive of other compounding ingredients such as stabilizer, filler and the like.

DESCRIPTION OF THE PREFERRED EMBODIMENTS

The Polybutadiene Resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1,000–200,000, so that they are of at least a flowable consistence. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than 4 minutes, and in some cases even within a few seconds. Cure times of more than 4 minutes may be desirable in the event that the halogen or metal compound used retards the cure rate; in these cases cure times of up to 15 minutes generally give acceptable results. Where fast cures are desired it is necessary to use a filler to avoid crazing or cracking. A filler, such as silica, clay, powdered glass, alumina, etc., is advantageously used in the proportion of 25–65, preferably 40–60, volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 150 to 500 parts by weight per 100 parts by weight of butadiene polymer or copolymer. In such cases it is desirable to include 0.5 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

The metal soap is preferably a Group II-A or II-B metal salt of an organic acid containing from 8 to 26 carbon atoms, and may be a mixture of any two or more such soaps in any proportion. Calcium stearate is often preferred.

THE FLAME-RETARDING AGENTS

The flame-retarding materials of this invention include, per 100 parts of resin, 2 to 20 parts of a bromine-releasing flame-retarding compound, e.g., tetrabromobenzene or hexabromobenzene or decabromobiphenyl or decabromobiphenyl oxide, etc. and 0.25 to 10 parts of chromium naphthenate.

The bromine-releasing flame-retarding compound is an aromatic compound which releases atomic or molecular bromine or a bromine compound such as hydrogen bromide, etc. on heating. The aromatic compounds are more stable and more valuable commercially than the aliphatic compounds.

There seems to be no benefit in the use of a mixture in which atoms of bromine to the atoms of the chromium is less than 2 to 1; but it may be greater, and it appears to be dependent upon the state of oxidation of the metal added and the oxidation states that can form upon combustion; and varies with different compounds. The chromium naphthenate used contained chromium substantially in the chromic state, having been produced in the reaction of chromic oxide and mixed naphthenic acids.

In the following examples, we record the limiting oxygen index (LOI) [see below] value of a control and the various compositions with 10 parts of tetrabromobenzene. The amount of tetrabromobenzene may be varied and hexabromobenzene, decabromobiphenyl or decabromobiphenyl oxide may be substituted. The amount of 10 parts was selected to show the flame-retarding effect of the mixtures; and with more or less of the bromine-releasing compound used, the amount of the chromium naphthenate may be varied.

The Cured Resins

The cured resins produced in accordance with this invention have exceptional resistance to deterioration of physical properties upon exposure at high temperatures when properly stabilized, although the flame-retarding agents of this invention may decrease this resistance, when present. The resins are therefore useful in many situations where heat exposure is a factor, as in structural electrical components, cooking utensil handles, and automobile engine compartment components, and flame resistance is important.

LIMITING OXYGEN INDEX (LOI) TEST

The screening method used to indicate the flammability behavior in these examples is the limiting oxygen index (LOI) technique. This measurement is defined as the percentage of oxygen in a nitrogen-oxygen mixture which is sufficient to maintain combustion in a vertically-positioned, top-lighted specimen measuring ⅛ × ¼ × 5 inches. The LOI figure is determined by the following equation in which the bracketed units refer to moles per volume of the oxygen and nitrogen in the atmosphere.

$$LOI = ([O_2]/[_2]+[N_2]) \times 100$$

and is found by determining at what minimum oxygen concentration the polymer specimen will either (a) burn longer than 3 minutes or (b) burn further than 3 inches. The determination is repeated several times for verification. A more complete and detailed description of the LOI test is given in test specification ASTM D-2863-70.

It is evident from the definition of LOI that higher LOI numbers infer lower flammability of the specimens tested in this configuration. LOI numbers above 21–22 indicate that combustion is not sustained in an ambient atmosphere. It has been reported that for certain molding compounds LOI results can be used to predict performance in other flame tests; LOI numbers greater than 28 generally inferred satisfactory performance in HLT-15, UL-94 or UL-484 flame tests (described by M. A. Harpold and K. E. Atkins, Journal of Fire and Flammability, Vol. 4, No. 1, pp. 2–7 (1973)). For the purposes of the screenings listed here, ranges of LOI were determined.

With the foregoing general discussion in mind, there are given herewith detailed experimental examples of the practice of this invention. All parts and percentages given are on the basis of weight, unless otherwise explicitly stated.

The following examples are illustrative of the use of the flame-retarding agents of this invention with different bromine-releasing flame-retarding agents. A solvent such as any aliphatic hydrocarbon, e.g., hexane, cyclohexane, etc. may be used in compounding the ingredients but is not essential.

|  | Parts by Weight | |
|---|---|---|
|  | Example 1 | Example 2 |
| Polybutadiene* | 100 | 100 |
| Silica | 380 | 380 |
| Vinyl triacetoxysilane | 3 | 3 |
| Calcium stearate | 3 | 3 |
| Dicumyl peroxide (40%) | 7.5 | 7.5 |
| Tetrabromobenzene | 10 | — |
| Decabromodiphenyl | — | 10.0 |
| Chromium naphthenate** | 5.0 | 5.0 |

*90% of butadiene units in 1,2-configuration; molecular weight parameters $M = 29,000$, $M_n = 23,000$, DSV = 0.3
**0.2 phr. as chromium The different samples were thoroughly mixed and dried under vacuum to remove any solvent used to facilitate mixing, and then pressed into 6 × 6 × ⅛ inch plaques and cured at 350° F., under 10 tons pressure for 8 minutes. These plaques were cut into ¼ inch strips for LOI tests. The results of the controls prepared as above and the test plaques containing the chromium naphthenates and the different bromine-releasing compounds subjected to the LOI test, and tested for hardness, are recorded in the following table.

| Results | LOI | Rockwell E |
|---|---|---|
| Control | 27.5–28.0 | 80–90 |
| Example 1 | 29.5–30.0 | 82 |
| * * * * | * * * * | * * * * |
| Control | 27.5–28.0 | 80 |
| Example 2 | 29.0–29.5 | 85 |

The Rockwell E hardness tests are included to show that the flame-retarding agents may affect the physical properties of the resins. The results show definite improvement in the flame resistance of the resins.

We claim:

1. A peroxide-cured or peroxide-curable polybutadiene polymer or copolymer resin which includes as a flame-retarding agent, 2 to 20 parts of an aromatic bromine-releasing flame-retarding agent to 0.25 to 10 parts of chromium naphthenate, the parts being by weight, and the resin being from the class consisting of homopolymers of butadiene and copolymers of butadiene and styrene containing at least 40 percent by weight of butadiene, and at least 80 percent by weight of the butadiene repeating units in the homopolymer or copolymer being in the 1,2-configuration.

2. The composition of claim 1 in which the bromine-releasing agent is tetrabromobenzene.

3. The composition of claim 1 in which the bromine-releasing agent is decabromobiphenyl.

4. A composition curable to a hard resin which, when cured, has substantial flame resistance, which composition comprises:

|  | Parts by Weight |
| --- | --- |
| Butadiene homopolymer or copolymer resin | 100 |
| Silica | 100 – 500 |
| Vinyltriacetoxysilane | 0.05 – 5.0 |
| Calcium stearate | 0.5 – 5.0 |
| A peroxide curing agent | 0.5 – 6.0 |
| Hexa- or tetrabromobenzene or decaoromobiphenyl or decabromobiphenyl oxide | 2 – 20 |
| Chromium naphthenate | 0.25 – 10 | the resin being from the class consisting of homopolymers of butadiene and copolymers of butadiene and styrene containing at least 40 percent by weight of butadiene, and at least 80 percent by weight of the butadiene repeating units in the homopolymer or copolymer being in the 1,2-configuration.

5. The composition of claim 4 in which the bromine-releasing compound is tetrabromobenzene.

6. The composition of claim 4 in which the bromine-releasing compound is decabromodiphenyl.

7. A peroxide-cured resin of substantial flame resistance, said resin comprising

|  | Parts by Weight |
| --- | --- |
| A butadiene polymer or copolymer resin | 100 |
| Silica | 100 – 500 |
| Vinyltriacetoxysilane | 0.05 – 5.0 |
| Calcium stearate | 0.5 – 5.0 |
| Hexabromobenzene or tetrabromobenzene or decarbromobiphenyl or decabromobiphenyl oxide | 2 – 20 |
| Chromium naphthenate | 0.25 – 10 | and the resin being from the class consisting of homopolymers of butadiene and copolymers of butadiene and styrene and containing at least 40% by weight of butadiene and at least 80% of the butadiene units in the polymer or copolymer being in the 1,2-configuration.

8. The composition of claim 7 in which the bromine-releasing compound is tetrabromobenzene.

9. The composition of claim 8 in which the bromine-releasing compound is decabromobiphenyl.

* * * * *

UNITED STATES PATENT OFFICE
CERTIFICATE OF CORRECTION

Patent No. 3,867,327    Dated February 18, 1975

Inventor(s) David F. Lawson and Delmar F. Lohr, Jr.

It is certified that error appears in the above-identified patent and that said Letters Patent are hereby corrected as shown below:

Column 3, Line 52 "LOI = $([O_2]/[_2]+[N_2]) \times 100$" should be --- LOI = $\dfrac{[O_2]}{[O_2]+[N_2]} \times 100$ ---

Column 5, Line 19 "decaoromobiphenyl or" should be ---decabromobiphenyl or ---

Column 6, Line 17 "decarbromobiphenyl or" should be ---decabromobiphenyl or ---

Signed and sealed this 6th day of May 1975.

(SEAL)
Attest:

RUTH C. MASON
Attesting Officer

C. MARSHALL DANN
Commissioner of Patents
and Trademarks